Patented Sept. 19, 1922.

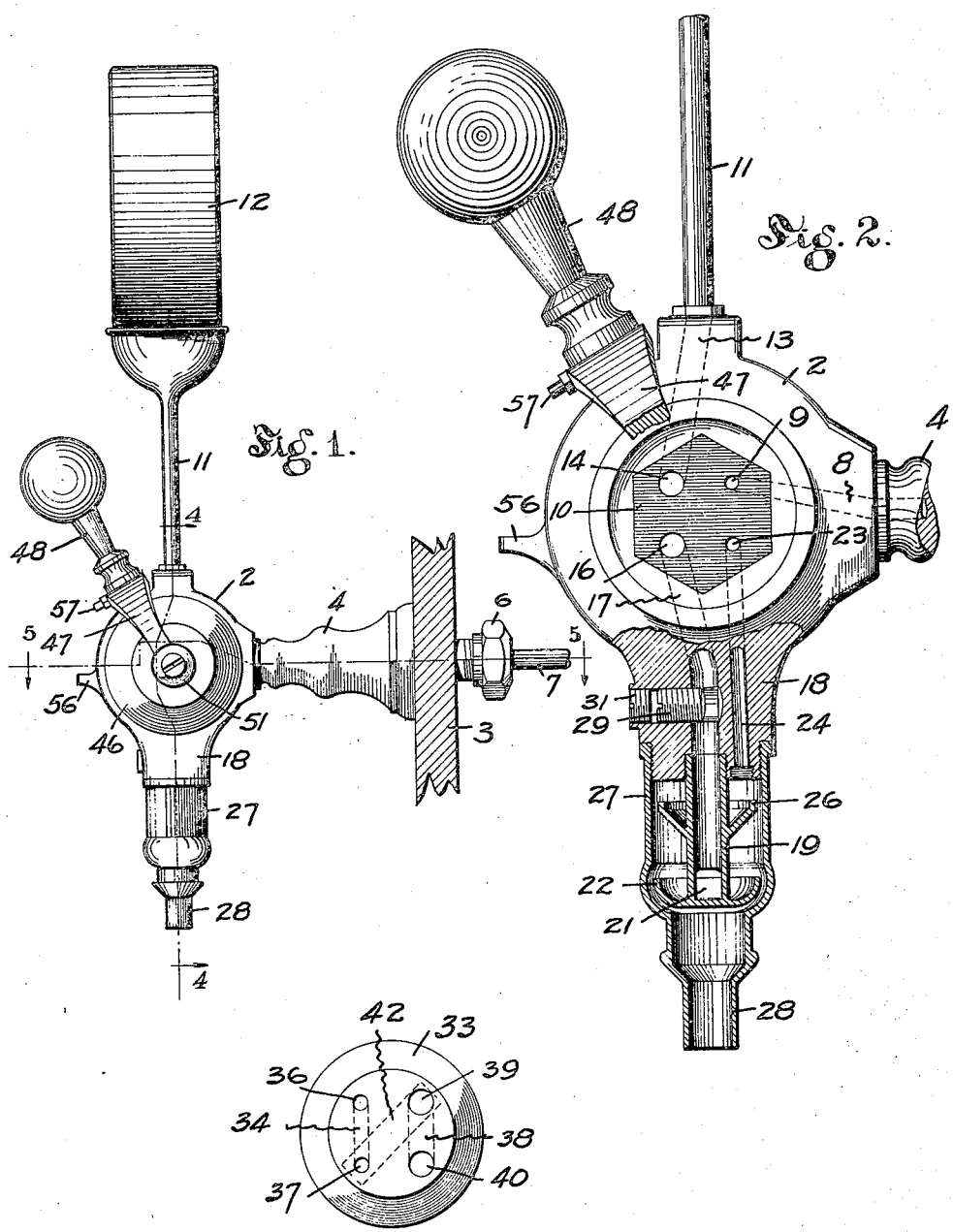

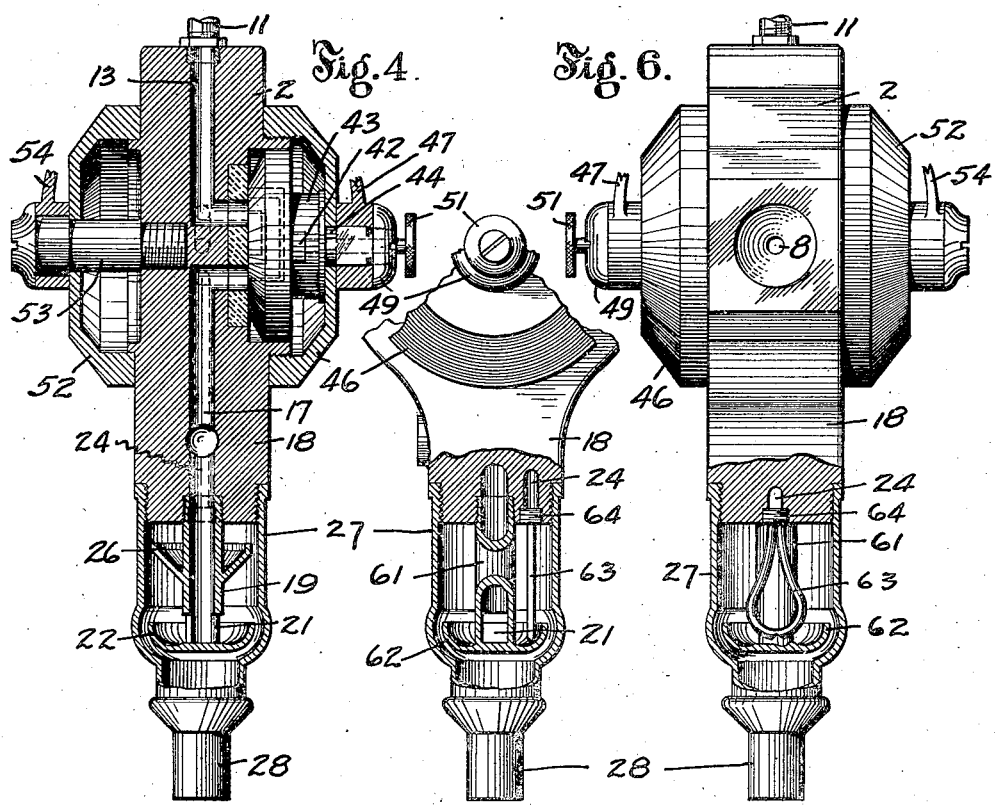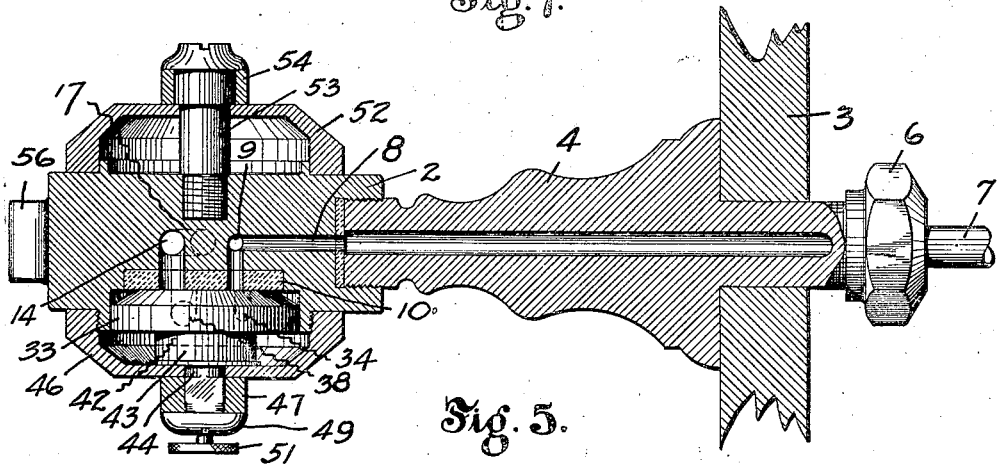

1,429,574

UNITED STATES PATENT OFFICE.

WILLIAM A. ENGLAND, OF SAN FRANCISCO, AND JOSEPH L. MATTINGLY, OF BERKELEY, CALIFORNIA, ASSIGNORS TO ENG-SKELL COMPANY, INC., OF SAN FRANCISCO, CALIFORNIA, A CORPORATION OF CALIFORNIA.

MIXING FAUCET.

Application filed February 15, 1921. Serial No. 445,081.

*To all whom it may concern:*

Be it known that we, WILLIAM A. ENGLAND and JOSEPH L. MATTINGLY, citizens of the United States of America, and residents, respectively, of the city and county of San Francisco, and Berkeley, county of Alameda, State of California, have invented a new and useful Mixing Faucet, of which the following is a specification.

Our invention relates to faucets and especially to faucets for mixing and delivering two fluids such as a syrup and carbonated water.

One of the objects of our invention is the provision of a faucet of the character referred to in which dripping of the fluids from the end of the faucet is prevented. Another object is the provision of a faucet which thoroughly mixes the fluids as they pass through it. Another object is to provide a faucet wherewith the volume and velocity of a discharging stream may be varied without varying the proportions of the component fluids.

The invention possesses other objects and features of advantage, some of which, with the foregoing, will be set forth in the following description of the preferred form of our invention which is illustrated in the drawings accompanying and forming part of the specification. It is to be understood that we do not limit ourselves to the showing made by the said drawings and description, as we may adopt variations of the preferred form within the scope of our invention as set forth in the claims.

Referring to the drawings:

Fig. 1 is a side elevation of our faucet, showing the same mounted on a panel. Fig. 2 is also a side elevation, but with certain portions removed and the other portions sectioned. Fig. 3 is an elevation of the valve disk. Fig. 4 is a vertical sectional view, the planes of section being indicated by the line 4—4 of Fig. 1. Fig. 5 is a horizontal sectional view, the planes of section being indicated by the line 5—5 of Fig. 1. Figs. 6 and 7 are elevations partly in section, and showing a modified form of faucet.

Our faucet comprises a stationary head 2 mounted on any convenient support such as the panel 3 by the bracket 4. The bracket is hollow and a coupling 6 on its inner end provides means for connecting it to the pipe 7 through which one of the fluids such as carbonated water is conducted under pressure from any suitable source. The opposite end of the bracket connects with a passage 8 which opens in the port 9 on the proportional valve seat 10. The valve seat comprises preferably a piece of leather sunk into the head and of polygonal form to prevent its turning.

The other fluid such as a syrup or a flavoring compound, which is to be mixed with the carbonated water is conducted to the head through the pipe 11 in the cupped upper end of which, the storage container 12 rests. The pipe 11 connects with a passage 13 in the head which opens in the port 14 on the valve seat.

Opening on the valve seat in the port 16, below the port 14, is the passage 17 which extends downwardly through the lower extension 18 of the head, and is continued through the removable tube 19 which is threaded into the bottom of the extension. The lower end of the passage opens in laterally placed ports 21 in the mixing cup 22 which is formed on the end of the tube. Opening on the valve seat in the port 23, below the port 9, is the passage 24, which extends through the head and opens directly above the diffusing cup 26, which is formed on the tube 19 above the cup 22.

Surrounding both cups 22 and 26 is a shell 27, terminating in the discharge nozzle 28. The nozzle piece is threaded on the extension 18 and is proportioned to leave an annular space surrounding the cups for the passage of the fluids.

A screw 29 acting as a valve is disposed in the extension 18 to control the size of the passage 17, and may be adjusted to permit the desired maximum flow of syrup. It will be noted that since the valve is adjacent the lower end of the passage it controls, the fullest possible head of syrup is available for forcing the flow through the passages and proportional valve above the cups. A plug screw 31 fills the end of the threaded recess in which the valve 29 lies.

Arranged on the valve seat 10 is a valve plate 33, which is provided with a passage 34 opening on the face of the valve in two ports 36 and 37 adapted to be registered respectively with ports 9 and 23. A second passage 38 opens on the face of the valve in two ports 39 and 40, adapted to be registered respectively with ports 14 and 16. Rotating the valve plate to cover or uncover these registrable ports, therefore controls the flow of fluids through the passages to the nozzle, and means are provided for rotating the valve plate. The back of the plate is formed with a key 42 seating in a groove formed in the valve cap 43, which is provided with a stem 44 journaled in the hood 46 fixed on the head and enclosing the valve. Beyond the short journal, the stem is squared to fit one arm 47 of the operating handle 48, and then threaded for the retaining nut 49. A set screw 51 threaded through the stem and impinging of the key 42 provides means for adjusting the pressure of the valve plate against the valve seat.

On the opposite side of the head the hood 52 gives symmetry. The hood is pierced by the pin 53 which forms a pivotal mounting for the other arm 54 of the handle. Rotary movement of the handle is limited by the fixed stop 56 on the head and the adjustable pin 57 on the handle. With the handle against the stop, the maximum volume of fluid at the maximum velocity is delivered from the nozzle 28.

Operation: With the valve 29 adjusted to the desired flow of syrup under the head provided by its own weight, the handle is pulled forward to turn the valve plate. As the valve turns, the ports are alined, the degree of opening of the passages being proportional at all times. The syrup runs down the passage 17 into the lower cup 22, and the carbonated water discharging under pressure from passage 24 into the upper cup is diffused and the stream broken up thereby, to emerge past the cup in an annular stream, which, striking the syrup in the lower cup thoroughly mingles therewith. After churning about in the space between the cups, the mixed fluids pass the lower cup and into the nozzle, from which the mixture is discharged.

The proportions of the annular space surrounding the lower cup and of the nozzle discharge opening are carefully determined to prevent the backing up of the carbonated water through the syrup passages. Upon shutting off the faucet, the fluids in the passages below the valve drain into the cups which retain them until the faucet is again used. Dripping of the fluids between operations is therefore eliminated.

While the handle will be customarily moved to fully open the passages, it is to be noted that, a partial opening will not change the proportions of fluids in the mixture delivered from the faucet, since both sets of ports are opened in the same degree.

In Figs. 6 and 7, we have shown a modified form of our faucet more desirable for serving certain drinks than the faucet just described, in that a greater foaminess is imparted to the beverage. In this structure the tube 61, similar to tube 19 shown in Fig. 4, and having a cup 62 formed on its lower end similar to the cup 22, is threaded into the lower end of the extension 18. The jet nozzle 63, formed by a loop of small caliber pipe, having the open ends secured in the threaded plug 64 is secrewed into its socket formed about the opening of the passage 24.

The jet nozzle extends into the cup 62 and discharges its fluid from an orifice 66 directly into the mixing cup. The action of the relatively smaller volume of carbonated water at a relatively higher velocity upon the syrup in the cup produces an increase in the foam content of the discharging mixture.

We claim:

1. A mixing faucet comprising a head formed with groups of related but unconnected passages, unitary means for connecting the related passages in each group, means for supplying one of the fluids to be mixed to one end of each group of passages, and means at the other ends of said passages for mixing said fluids and discharging the mixture.

2. A mixing faucet comprising a head formed with groups of related but unconnected passages, means for simultaneously connecting the related passages in each group for the flow therethrough of the fluids to be mixed in unvarying proportions, means for supplying one of said fluids to one end of each group of passages, and means at the other ends of said passages for mixing said fluids and discharging the mixture.

3. A mixing faucet comprising a head, a valve seat arranged on said head, said head being formed with groups of related passages opening in ports on said valve seat, a valve plate mounted for movement on said valve seat and formed with passages therein for connecting the ports of the related passages of each group, means for supplying one of the fluids to be mixed to one end of each group of passages, and means at the other ends of said passages for mixing said fluids and discharging the mixture.

4. A mixing faucet comprising a head, a valve seat arranged on said head, said head being formed with groups of related passages opening in ports on said valve seat, a valve plate mounted for rotary movement on said valve seat and formed with passages therein for connecting the ports of the related passages of each group for the flow therethrough of the fluids to be mixed in unvarying proportions, means for supplying one of said fluids to one end of said group of passages, and means at the other ends of said passages for mixing said fluids and discharging the mixture.

5. A mixing faucet comprising a cup, means for feeding to said cup one of the fluids to be mixed, means for simultaneously directing a stream of the other fluid to be mixed into said cup, and a nozzle for discharging the mixed fluids.

6. A mixing faucet comprising a cup, means for feeding to said cup one of the fluids to be mixed, means for simultaneously directing an annular stream of the other fluid to be mixed into said cup, and a nozzle for discharging the mixed fluids.

7. A mixing faucet comprising a cup, means for feeding to said cup in controllable amounts one of the fluids to be mixed, means controlled by said feeding means for directing a stream of the other fluid to be mixed under pressure into said cup, and a nozzle for discharging the mixed fluids.

8. A mixing faucet comprising a head, a mixing cup on said head, means for feeding one of the fluids to be mixed into said cup, and means for forming and directing an annular stream of the other fluid into said mixing cup.

9. A mixing faucet comprising a head, a tubular extension on said head, a mixing cup on said extension, a diffusing cup on said extension, means for feeding one of the fluids to be mixed into said mixing cup, and means for feeding the other fluid to be mixed into said diffusing cup, and a shell surrounding and spaced from said cups and forming a nozzle below the mixing cup for discharge of the mixed fluids.

In testimony whereof, we have hereunto set our hands.

WILLIAM A. ENGLAND.
JOSEPH L. MATTINGLY.